United States Patent
Martin et al.

(10) Patent No.: US 7,275,278 B1
(45) Date of Patent: Oct. 2, 2007

(54) GRILL CLEANING DEVICE

(76) Inventors: W. Andrew Martin, 435 Blankenship Rd., Ramer, TN (US) 38367; Todd Martin, 435 Blankenship Rd., Ramer, TN (US) 38367

( * ) Notice: Subject to any disclaimer, the term of this patent is extended or adjusted under 35 U.S.C. 154(b) by 212 days.

(21) Appl. No.: 10/278,363

(22) Filed: Oct. 22, 2002

Related U.S. Application Data

(60) Provisional application No. 60/411,999, filed on Sep. 19, 2002.

(51) Int. Cl.
*A47I 3/00* (2006.01)
(52) U.S. Cl. .................. 15/236.01; 15/236.05; 15/236.07
(58) Field of Classification Search ............. 15/236.01, 15/236.05, 236.07, 236.06, 236.09, 236.08; 30/169, 340; 420/521, 522, 477, 491
See application file for complete search history.

(56) References Cited

U.S. PATENT DOCUMENTS

| | | | |
|---|---|---|---|
| 2,824,323 A | 2/1958 | Tos et al. .................. 15/105 |
| 3,130,436 A * | 4/1964 | Krause et al. |
| 3,800,354 A | 4/1974 | Stephens .................. 15/236 R |
| 3,820,185 A | 6/1974 | Phillips .................. 15/105 |
| 4,080,735 A * | 3/1978 | Michalski .................. 30/345 |
| 4,112,537 A * | 9/1978 | Heuck .................. 15/105 |
| 4,214,342 A | 7/1980 | Amundsen .................. 15/236 R |
| D264,543 S | 5/1982 | Ashley .................. D32/49 |
| 4,432,334 A * | 2/1984 | Holt |
| 4,668,302 A | 5/1987 | Kolodziej et al. .............. 134/6 |
| D304,892 S | 12/1989 | Bevilacqua .................. D7/99 |
| 4,958,403 A | 9/1990 | Martin .................. 15/236.07 |
| 5,373,600 A * | 12/1994 | Stojanovski et al. .......... 15/111 |
| 5,479,673 A | 1/1996 | Carton .................. 15/111 |
| D377,251 S | 1/1997 | Mitchell .................. D32/49 |
| 5,616,022 A | 4/1997 | Moran, IV .................. 431/253 |
| 5,720,071 A | 2/1998 | Hall .................. 15/236.08 |
| 5,987,693 A | 11/1999 | Noga .................. 15/236.08 |
| 6,061,862 A | 5/2000 | Whitaker .................. 15/111 |
| 6,125,493 A * | 10/2000 | Daw .................. 15/111 |
| 6,134,743 A * | 10/2000 | Schmidt .................. 15/236.01 |
| 6,216,306 B1 * | 4/2001 | Esterson et al. ............. 15/111 |
| 6,643,888 B2 * | 11/2003 | Griffith .................. 15/236.06 |

FOREIGN PATENT DOCUMENTS

EP  1361339  * 11/2003

OTHER PUBLICATIONS

Condensed Chemical Dictionary Tenth Edition by Gessner Hawley.*
Hack's Dictionary fifth edition.*
Internet www.madehow.com/Volume-6-Brass.html Brass vol. 6 pp. 1-6.*

* cited by examiner

*Primary Examiner*—David Redding
(74) *Attorney, Agent, or Firm*—Wyatt, Tarrant & Combs, LLP

(57) ABSTRACT

A scraping tool for cleaning the grill rods making up the surface of a cooking grill having a handle, a rigid shaft extending therefrom and a scraping blade. The blade in a preferred form is comprised of brass and is die cut from a brass plate, having a thickness of about 1/th inch. The handle has a shape and texture to comfortably fit the hand when gripped to perform the cleaning operation requiring short back and forth strokes while bearing down on the tool and grill surface with a moderate amount of force.

8 Claims, 2 Drawing Sheets

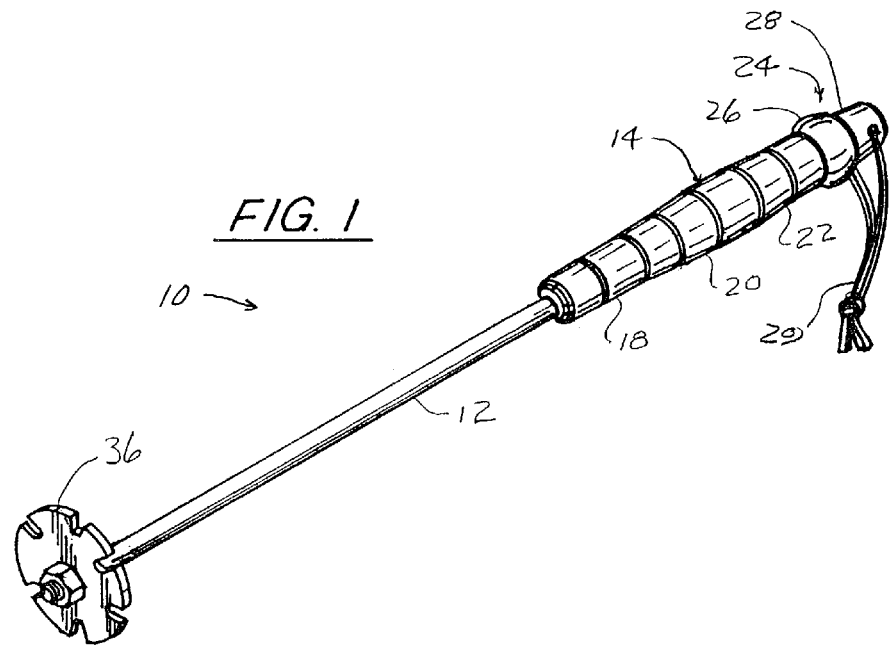
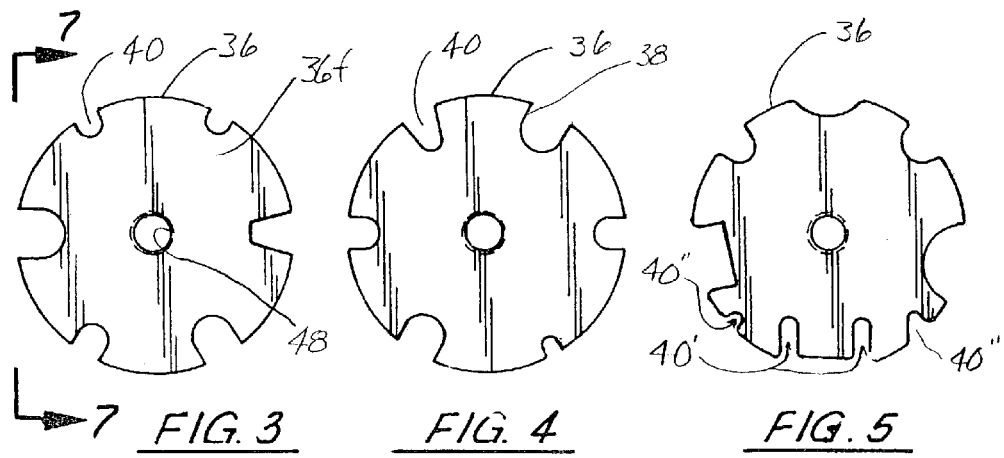

GRILL CLEANING DEVICE

CROSS-REFERENCE TO RELATED APPLICATIONS

This application claims priority of U.S. Provisional Patent Application Ser. No. 60/411,999 Filed Sep. 19, 2002.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to devices for cleaning the grates of cookery fired by wood, charcoal, gas (butane or propane) and the like. Grills for outdoor cooking by such as charcoal or gas have become increasingly more popular in recent years. Such grills typically build up deposits of food, grease, sauces and oils used in the cooking, which carbonize and are both unattractive to look at and difficult to remove.

2. General Background of the Invention up on cooking grills. These have ranged from various styles of scraping devices to stiff-bristled brushes. Several patents illustrate the development of the prior art.

U.S. Pat. No. 2,824,323 to Tos, et al, illustrates a combination grill scraper and a brush. The scraper (17, 40, 43) and brush 30 are removable from the handle such that the scraper blades may be changed and the brush optionally attach. The blade is specified to be of a hardened metal such that the edges remain sharp.

U.S. Pat. No. 3,800,354 to Stevens teaches a grill cleaner having a handle with flexible parallel bars upon which are mounted rotatably mounted, spaced disks. Each disc is made of a hard metal, such as tool steel, and has uniformly spaced notches in its periphery.

The grill cleaning device of U.S. Pat. No. 3,820,185 to Phillips incorporates a blade formed of a single strip of metal, bent at one end to form the blade and incorporating two differently sized slots, and the other end of which is encased in a handle. The twist is illustrated to be about 90 degrees and provides additional strength to the handle extension for the cleaning operation.

Another version of a grill scraping tool is illustrated in U.S. Pat. No. 4,112,537 to Heuck. In contrast to the previously discussed embodiments wherein the scraping blades or discs were mounted essentially perpendicular to the handle, the Heuck device has a rotatable, circular blade having a plurality of circumferential extensions containing U-shaped indentations of varying diameters/widths. The user selects the particular extension having the U-shaped opening to best fit the rods or wires of the grill and rotates that extension into position for cleaning. In the Heuck version, the plane of the blade is slightly (an acute angle) offset from the axis of the handle.

Design Pat. 264,543 to Ashley illustrates a grill scraper having a square blade disposed perpendicular to the handle.

U.S. Pat. No. 4,214,342 to Amundsen illustrates a tubular handle with tubular blade extensions on either ends of the handle. Each end includes a single slot to form a cutting edge for cleaning the grill.

U.S. Pat. No. 4,668,302 illustrates a grill cleaning tool having a stationary blade, the plane of which is in line with the axis of the handle. The blade has a plurality of differently shaped recesses to be selectively used to clean the wires or bars of a grill. The tool blade is described as being die cut from a sheet of galvanized steel.

Design Pat. 304,892 to Bevilacqua illustrates a grill cleaner having a structure somewhat similar to that of Ashley, however having a triangularly shaped blade with different sized/shaped slots.

U.S. Pat. No. 4,958,403 to Martin illustrates a grill scraping tool wherein the blade is rectangular and the lesser sides of which have access slots and transverse slots for receiving the grill wire or rod to be cleaned. Other than being described as metallic, there is no further information as to the structure of the blade.

The tool disclosed in U.S. Pat. No. 5,479,673 to Carton is amulti-function device including a scouring pad, a brush and a scraping blade extending from the handle, wherein the blade has a single rounded projection intermediate two transverse sections for cleaning the wires or bars of the grill.

Design Pat. 377,251 to Mitchell illustrates a grill cleaning tool similar to the Ashley device, having a rectangular, perpendicularly positioned blade with numerous slots for forming cleaning edges.

U.S. Pat. No. 5,616,022 to Moran illustrates a combined grill ignitor and scraper device. Extending from the handle is a tube which at its distal end includes the electrodes for generating a spark to ignite such as propane gas contained within the handle for lighting the grill, intermediate the tines is a cleaning edge for scraping the wires or bars of the grill.

Another version of a scraping tool is illustrated in U.S. Pat. No. 5,720,071 to Hall which includes an ergonomic handle for cleaning the grill with a back and forth motion, the handle terminating in a flat plate having a plurality of teeth attached thereto. The device is intended for the cleaning of commercial grills and broiler grates having a plurality of staves, between which the teeth of the tool extend during cleaning.

U.S. Pat. No. 5,987,693 to Noga is a variation of the Hall tool wherein the plate is oriented vertically with respect to the grill during cleaning (as contrasted to horizontally in Hall) with teeth extending for being received between the rails. The Noga device is distinguished by its being mounted on a downwardly projecting portion of the handle and rotatable so as to be received in grills with varying spacing between the rails.

The grill cleaning tool illustrated in U.S. Pat. No. 6,061,862 includes a handle with a brush and blade scraper disposed at the distal end and a shield extending generally rearwardly of the brush, under the handle to protect the user from the flame and heat of the grill, should cleaning be carried out while the grill is in operation.

In spite of the numbers and variety of grill cleaning tools in the art, none are completely satisfactory, particularly over a longer term of use. Some tools exhibit the necessary rigid structure to withstand a fairly heavy application pressure during the cleaning process however, that pressure causes the performance of the tool to deteriorate, or in the alternative, to cause unacceptable wear on the grill itself. Prior art devices dull, causing greater necessary effort to accomplish the cleaning, causing added wear, either to the grill or the cleaning device. The present invention utilizes a particular structure and cleaning blade such that the tool delivers an unexpected longevity and does not cause inordinate wear or deterioration of the grill components.

BRIEF SUMMARY OF THE INVENTION

The present invention provides an improved tool for cleaning the baked and charred grease, sauces and food particles which build up over time during the use of a wood, charcoal or gas grill. Those who enjoy outdoor cooking on charcoal and gas grills are familiar with the difficulties in obtaining a suitable tool for the removal of the hard, securely adhered build up on the grill rods and wires. The present invention provides a grill cleaning tool which will endure as a useful device for a prolonged period and readily scrape and cut the build up on grills with only a nominal exertion of force.

The present invention is directed to a grill cleaning tool which has an ergonomically design handle to fit the hand for an easy and secure grasp of the too in order to provide a firm and repeatable back-and-forth cleaning stroke. The tool includes a rigid shaft upon which the cutting and scraping blade is mounted such that the force put on the handle is completely transmitted through the shaft to the blade so that it firmly rides the grill rods and wires during cleaning.

In the preferred embodiment, the scraper blade is composed of a metal which is slightly softer or more malleable than the material of the grill rods or wires such that during the back and forth operation of the tool, the surface of the rods or wires is not deformed. Better quality grills are equipped with grills which are coated with a ceramic or similar coating which should be protected such that it retains its non-stick quality over the service life of the grill. Such state of the art coatings are non-porous and non-corrosive such that the grill is longer lasting, and the food is more easily moved, rotated and removed in the cooking process leading to less sticking of the food and its break-up in the process. Should the cleaning tool have a cleaning edge of a material harder than the grill surface material, there is risk that the grill surface will be worn off or otherwise scratched or damaged. The present invention incorporates a brass blade which is die cut to form the cutting surfaces such that the grill rods will remain unharmed in the cleaning process. Of particular note is that the action of the brass blade sliding on the ceramic grill rod tends to sharpen the blade in its normal use such that the premium cutting/scraping edge is retained throughout the cleaning process, providing the user with an expeditious and effective cleaning of the grill.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a pictorial view of an embodiment of the apparatus of the present invention;

FIG. 3 is a front elevation of a scraping blade of the invention;

FIG. 4 is an alternative embodiment of the blade shown in FIG. 4;

FIG. 5 is another alternative embodiment of the blade shown in FIG. 4;

DETAILED DESCRIPTION OF THE INVENTION

FIG. 1 through illustrate the grill cleaning tool 10 of the present invention. Tool 10 consists of a shaft 12, which in the preferred embodiment is composed of a tool grade steel having a black oxide plating thereon. In the alternative, the shaft 12 may comprise an aluminum shaft which provides somewhat lighter weight and less opportunity for oxidization, should the surface of the shaft become nicked or scratched through contact with the grill or other metal objects. In the illustrated embodiment, shaft 12 is approximately 5/16 inches in diameter and about 12 inches in length. Those skilled in the art will appreciate that the shaft may be somewhat larger or smaller in diameter or somewhat shorter or longer in length and still provide an effective tool.

Figure 2:
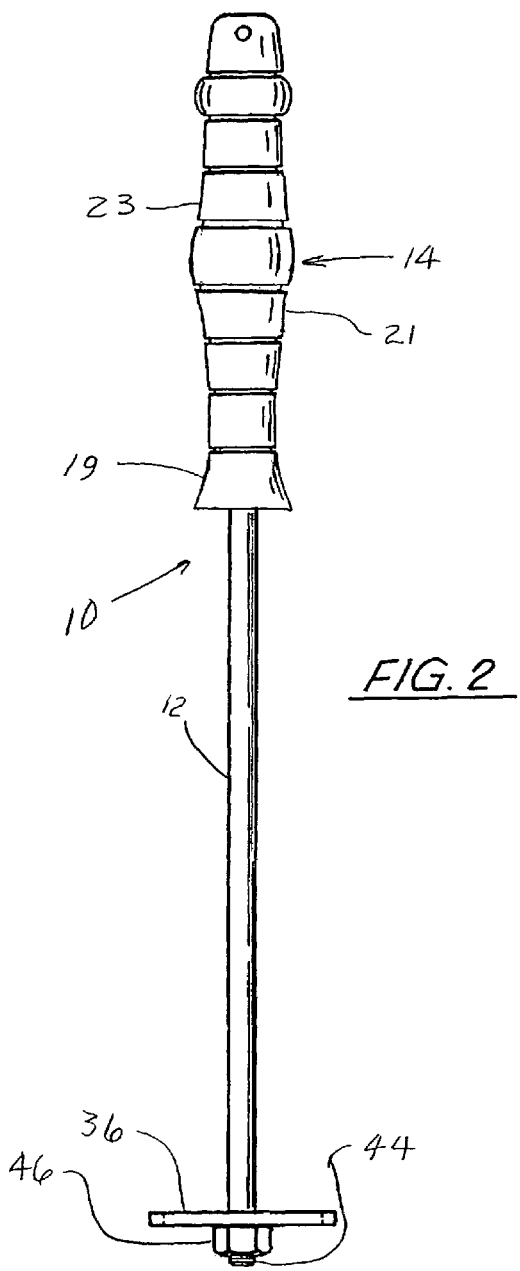
FIG. 2 is a plan view of the preferred embodiment of the apparatus illustrated in FIG. 1.
Figure 6:
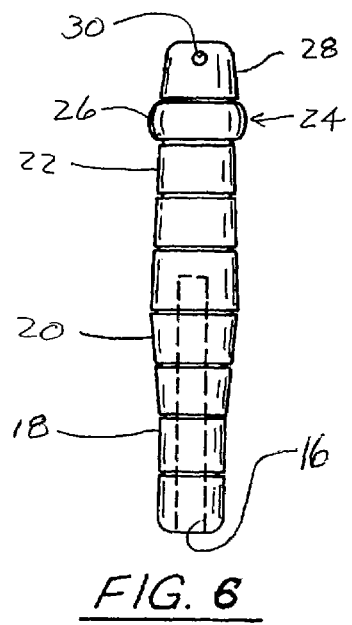
FIG. 6 is an alternative embodiment of the handle of the invention illustrated in FIG. 2
Figure 7:
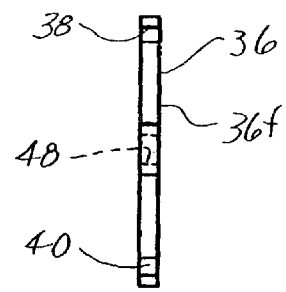
FIG. 7 is a side elevational view of the blade illustrated in FIG. 4.

At one end of shaft 12 is handle 14 which is preferably from about 6 to about 7 inches in length. Shaft 12 is received into a bore 16 in handle 14 to a depth of about three inches, bore 16 being slightly less in diameter than the nominal diameter of shaft 12, to ensure a tight friction fit. Handle 14 is preferably selected from one of the high density nut woods as hickory, oak or ash, however could be of a synthetic material such as polyurethane. In FIG. 2 the handle 14 is illustrated as having a cross section gradually reducing 19, then increasing 21, and then reducing again 23 prior to knob 28 to provide an ergonomically comfortable feel to the hand when utilized. In the illustrated embodiment of FIG. 6, handle 12 is composed of three conical sections 18, 20 and 22 and terminating at the distal end in a knob 24. As illustrated, conical section 18 has a nominal diameter of about 7/8 inches on the end facing shaft 12, decreasing in diameter to about 3/4 inches where section 18 joins section 20. Section 20 increases in diameter toward section 22 to about 1 inch at the juncture of sections 20 and 22. Section 22 then reduces in diameter to about 7/8 inches at its distal extent where it joins knob 24, being composed of ring 26 and cap 28. The shape of handle 14 with the varying diameters creates a gradually varied diameter to handle 14, the thickest part of which is centrally located and enables a comfortable and firm grip in the palm of the hand, the thickest portion generally being centered in the palm at the juncture of sections 20 and 22. Accordingly, the thumb and forefinger of the closed hand holding handle 14 are positioned approximately at the juncture of sections 18 and 20. As those skilled in the art will recognize, the recited dimensions may be varied somewhat to accommodate larger or smaller hands. Handle 14 terminates in knob 24 including ring 26 and cap 28. Ring 26 in the illustrated embodiment has an outside maximum diameter of about 1 1/4 inches and provides additional grasping comfort and convenience when carrying or bringing the tool 10 into position for use. Cap provides a convenient means for inclusion of a storage mechanism such as a loop 29 of rawhide strap or string inserted through hole 30.

The operating end of tool 10 includes blade 36 disposed thereon, which is preferably made of brass which in addition to the copper and zinc, contains smaller amounts of lead and iron. The effective composition of brass in the invention includes copper from about 65% to about 75% by weight, lead from about 0.002% to about 0.005% by weight, iron from about 0.01% to about 0.025% by weight with the remainder of zinc. Compositions in the range of about 69% to about 70% by weight of copper, about 0.0025% to about 0.0045% by weight of lead, and about 0.01% to about 0.025% by weight of iron with the remainder of zinc are optimal. In the described embodiments, blades 36 were composed by weight of:

| Cu | Pb | Fe | Zn |
|---|---|---|---|
| 69.34 | 0.003 | 0.012 | 30.645 |
| 69.43 | 0.004 | 0.022 | 30.634 |

Blade 36 is about two inches in diameter and is preferably die stamped, so as to provide sharp cutting edges 38, as subsequently described. The periphery of blade 36 has a variety of cutting slots 40 disposed therein. These slots 40 are selected based upon the cross section of the several grill wires/rods currently in the market upon which tool 10 is used. The cutting slots 40 are generally U-shaped, V-shaped and trapazoidally shaped. Special purpose combinations may also be included, a is illustrated in FIGS. 3 through 6, wherein slots 40 and parings 40' and 40" illustrate combinations for such grills as Aussie Bonza 4, Brinkman, Char-Broil, Coleman, DCS, Ducane, Fiesta, Grill-n-Roast, Jenn-Air, Thermos and Weber. To ensure that blade 36 is securely retained on shaft 12, shaft 12 is adapted with a threaded end 44 on to which such as cap nut 46 may be screwed. In the preferred embodiment illustrated, blade 36 has a central hole 48 which is also taped such that it may be screwed onto threaded end 44 and tightened to the end butt of the threaded end 44, and thus cap nut 46 provides additional security that blade 36 will not loosen.

Blade 36 is manufactured from forged brass by die cutting. The blade 36 may be about 1/16 to about 1/4 inches in thickness. Preferably the thickness of blade 36 is from about 1/8th inch to about 3/16 inches. The material is chosen because of a combination of its properties, which prior to the present invention, the synergism of them with the application were not appreciated. Brass is known as a durable metal alloy which is resistant to corrosion, withstands fairly high temperatures and is readily machinable. For its application to cleaning grill wires and rods, the material has a relatively sharp cutting edge placed at the intersection of the faces 36f of blade 36 and the slots 40. This edge is important to the effective removal of the baked on grease and sauces since it operates in a manner equivalent to a paint scraper in removing the built up deposits. Therefore, it is important that the edge not dull appreciably during the cleaning process. Those skilled in the art will recognize that better quality barbeque grills and kitchen installation gas grills utilize grill grates wherein the rods have been coated with a ceramic or similar material, or made of a very high temperature, hardened tool steel. One would not expect that the properties of brass would provide a material benefit in the use of a grill cleaning too, but the slideabiliby of the cutting slot 40 on the rods makes the tool easier to use. Further, the comparative softness of the alloy (though it is quite hard) ensures that the blade 40 wears on use, rather than risking deformation of the grill rod surfaces. The combination of the wearing of the blade against the harder grill rods during use acts to sharpen the blade 40, because the relative rigidity of the shaft 12 does not bend under use allowing blade 40 to be maintained substantially perpendicular to the grill rod in use such that the edges 36f are continually sharpened as the blade is used. Use of a relatively hard material such as brass also reduces the wearing during use such that, surprisingly, little wear is observed during use and the tool has remarkably good longevity. Blades have known to remained useable for several years of significant cleaning.

PARTS LIST

The following is a list of suitable parts and materials for the various elements of the preferred embodiment of the present invention.

| Part No. | Description |
|---|---|
| 10 | grill leaning tool |
| 12 | shaft |
| 14 | handle |
| 16 | handle bore |
| 18 | conical handle section |
| 19 | reducing handle section |
| 20 | conical handle section |
| 21 | increasing handle section |
| 22 | conical handle section |
| 23 | reducing handle section |
| 24 | knob |
| 26 | ring |
| 28 | cap |
| 29 | loop |
| 30 | hole |
| 36 | blade |
| 36f | blade face |
| 38 | cutting edge |
| 40 | cutting slot |
| 40' | cutting slot pair |
| 40" | cutting slot pair |
| 44 | threaded end |
| 46 | cap nut |
| 48 | central hole |

The invention has been described in context of what is presently considered to be the most practical and preferred embodiment. It is to be understood that the invention is not to be limited to the illustrated embodiments but, is intended to cover various modifications and equivalent arrangements included within the description and spirit and scope of the appended claims. Accordingly, the scope of the claims is to be accorded the broadest interpretation so as to encompass all such modifications and equivalent structures as is permitted under the law.

The invention claimed is:

1. A cleaning tool for scraping long lasting parallel rods of ceramic and stainless steel surfaces making up the cooking surface of a cooking grill comprising:
   a handle having an ergonomic exterior surface to the human hand;
   a shaft mounded in the handle and extending outwardly therefrom;
   a scraping blade fixedly secured on the end of said shaft substantially transverse thereto and opposite said handle;
   said scraping blade being composed of a material having a hardness less than the hardness of the surface of the grill rods;
   said scraping blade further having a slot therein to closely receive the grill rod, and the edge of said slot at the juncture of the sides of the blade forming a cutting edge; and
   the scraping blade material is brass and comprised from about 65% by weight to about 75% by weight of copper, from about 0.002% by weight to about 0.005% by weight of lead, from about 0.01% by weight to about 0.025% by weight of iron with the remainder being zinc.

2. The scraping tool of claim 1 wherein the shaft is axially aligned with the axis of the handle.

3. The scraping tool of claim 1 wherein the axis of the shaft and the axis of the handle are coincident.

4. The scraping tool of claim 1 wherein the blade has a thickness of from about 1/16 inch to about 1/4 inches.

5. The scraping tool of claim 4 wherein the blade has a thickness of about 1/8 inch to about 3/16 inches.

6. The scraping tool of claim 1 wherein the brass is comprised of about 69% by weight to about 70% by weight of copper, from about 0.0025% by weight to about 0.0045% by weight of lead, from about 0.01% by weight to about 0.025% by weight of iron, with the remainder being zinc.

7. The scraping tool of claim 1 wherein the blade has two adjacent slots of a similar shape spaced apart a distance substantially equal to the spacing of the rods of a grill.

8. The scraping tool of claim 4 wherein the blade is die cut from a brass plate.

* * * * *